(12) United States Patent
Lee

(10) Patent No.: US 12,745,141 B2
(45) Date of Patent: Sep. 22, 2026

(54) COMMUNICATION APPARATUS FOR VEHICLE AND METHOD OF EVALUATING COMMUNICATION PERFORMANCE THEREOF

(71) Applicants: HYUNDAI MOTOR COMPANY, Seoul (KR); KIA CORPORATION, Seoul (KR)

(72) Inventor: Woo Cheul Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 332 days.

(21) Appl. No.: 18/414,709

(22) Filed: Jan. 17, 2024

(65) Prior Publication Data

US 2025/0063441 A1 Feb. 20, 2025

(30) Foreign Application Priority Data

Aug. 18, 2023 (KR) ........................ 10-2023-0108444

(51) Int. Cl.
*H04W 36/00* (2009.01)
*H04W 36/32* (2009.01)

(52) U.S. Cl.
CPC ................ *H04W 36/00833* (2023.05); *H04W 36/322* (2023.05)

(58) Field of Classification Search
None
See application file for complete search history.

(56) References Cited

U.S. PATENT DOCUMENTS 9,077,655 B2 * 7/2015 Babiarz ................... H04L 47/32
2017/0135018 A1 * 5/2017 Amini ................. H04L 43/0894

FOREIGN PATENT DOCUMENTS

WO WO-2023039593 A2 * 3/2023 ............ H04W 84/12

* cited by examiner

*Primary Examiner* — Adolf Dsouza
(74) *Attorney, Agent, or Firm* — MCDONNELL BOEHNEN HULBERT & BERGHOFF LLP

(57) ABSTRACT

A method of evaluating performance of a communication apparatus for a vehicle includes performing communication with a base station, monitoring a fail event and determining a fail event score based on results of the monitoring, monitoring an attempt of a handover and determining a pingpong handover (PPHO) score based on results of the monitoring, monitoring a retention time within a shadow area and determining a service score based on results of the monitoring, and determining a final score based on the fail event score, the PPHO score, and the service score.

18 Claims, 10 Drawing Sheets

300

310

Communication unit (330)

Memory (350)

Fail event score determination unit (311)

PPHO score determination unit (313)

Service score determination unit (315)

Final score determination unit (317)

| TIME_STAMP | Reference Phone | | | Comparison Modem | | |
|---|---|---|---|---|---|---|
| | L3 Failure Event | L3 Failure Event(RCA) | Point | L3 Failure Event | L3 Failure Event(RCA) | Point |
| | | | ⋮ | | | |
| 2019-07-02 16:18:17.00 | | | | | [LTE]Interference | |
| 2019-07-02 16:18:17.00 | | | | | [LTE]Poor SINR | |
| 2019-07-02 16:18:17.00 | | | | | [LTE]Sudden Drop in SINR | |
| 2019-07-02 16:18:17.86 | | | | [LTE]SIB_READ_FAILURE | | -5.0 |
| 2019-07-02 16:26:57.00 | | [LTE]Poor SINR | | | | |
| 2019-07-02 16:27:05.00 | | [LTE]Large TA Gap in the Same PCI | | | | |
| 2019-07-02 16:27:07.00 | [LTE]Continuous Weak SINR | | -0.1 | | | |
| 2019-07-02 16:28:12.00 | | | | | [LTE]Poor SINR | |
| 2019-07-02 16:28:16.00 | | | | | [LTE]Large TA Gap in the Same PCI | |
| 2019-07-02 16:28:41.00 | | | | [LTE]Continuous Weak SINR | | -0.5 |
| 2019-07-02 16:28:50.00 | | [LTE]Poor SINR | | | | |
| 2019-07-02 16:28:50.00 | | [LTE]Sudden Drop in SINR | | | | |
| 2019-07-02 16:28:51.45 | | [LTE]Missing MR Detection | | | | |
| 2019-07-02 16:28:51.26 | [LTE]RLF | | -0.5 | | | |
| 2019-07-02 16:28:51.93 | [LTE]t310_Expiry | | -0.5 | | | |
| 2019-07-02 16:33:55.00 | | [LTE]Poor SINR | | | | |
| 2019-07-02 16:34:07.00 | [LTE]Continuous Weak SINR | [LTE]Large TA Gap in the Same PCI | -0.1 | | | |
| | | | ⋮ | | | |
| | | SCORE: | 93.3 | | SCORE: | 84.0 |
| Summary | [LTE]RLF | 2 | -1.0 | [LTE]RLF | 3 | -1.5 |
| | [LTE]Continuous Weak SINR | 12 | -1.2 | [LTE]Continuous Weak SINR | 7 | -0.7 |
| | [LTE]t310_Expiry | 1 | -0.5 | [LTE]SIB_READ_FAILURE | 2 | -10.0 |
| | [LTE]RRE Reject | 2 | -1.0 | | | |
| | [LTE]RACH_PROBLEM | 2 | -1.0 | | | |
| | [LTE]MAX_RETRX | 1 | -0.5 | | | |
| | [LTE]rlc_MaxNumRetx | 1 | -0.5 | | | |
| | [LTE]randomAccessProblem | 2 | -1.0 | | | |

| TIME_STAMP | Reference | | | | | | | | |
|---|---|---|---|---|---|---|---|---|---|
| | Band | EARFCN | PCI | Event Report Frequency | Event Report Physical Cell ID | Event Report New Cell Cause | HO Attempt Time Diff | HO Source to Target Info | PPHO |
| 2019.07.02 16:26:30.45 | | | | | | | 33.626 | 2850/398 to 2850/21 | |
| 2019.07.02 16:26:31.00 | Band7 | 2850 | 21 | | | | | | |
| 2019.07.02 16:26:31.09 | | | | 2850 | 21 | Handover | | | |
| 2019.07.02 16:26:31.61 | | | | | | | | | |
| 2019.07.02 16:26:31.70 | | | | | | | 1.251 | 2850/21 to 2850/54 | |
| 2019.07.02 16:26:31.95 | | | | | | | | | |
| 2019.07.02 16:26:32.00 | Band7 | 2850 | 54 | | | | | | |
| 2019.07.02 16:26:32.62 | | | | 2850 | 54 | Handover | | | |
| 2019.07.02 16:26:33.00 | Band7 | 2850 | 54 | | | | | | |
| 2019.07.02 16:26:33.01 | | | | | | | 1.315 | 2850/54 to 2850/21 | PPHO(2850/21↔2850/54) |
| 2019.07.02 16:26:33.15 | | | | 2850 | 21 | Handover | | | |
| 2019.07.02 16:26:33.51 | | | | | | | | | |
| 2019.07.02 16:26:33.57 | | | | | | | | | |
| 2019.07.02 16:26:34.00 | Band7 | 2850 | 21 | | | | | | |
| 2019.07.02 16:26:34.57 | | | | | | | 1.561 | 2850/21 to 2850/54 | PPHO(2850/54↔2850/21) |
| 2019.07.02 16:26:34.66 | | | | 2850 | 54 | Handover | | | |
| 2019.07.02 16:26:35.00 | Band7 | 2850 | 54 | | | | | | |
| 2019.07.02 16:26:35.35 | | | | | | | 0.775 | 2850/54 to 2850/398 | |
| 2019.07.02 16:26:35.46 | | | | 2850 | 398 | Handover | | | |
| 2019.07.02 16:26:36.00 | Band7 | 2850 | 398 | | | | | | |
| 2019.07.02 16:26:36.46 | | | | | | | | | |
| 2019.07.02 16:26:36.98 | | | | | | | 1.627 | 2850/398 to 2850/54 | PPHO(2850/54↔2850/398) |
| 2019.07.02 16:26:37.00 | Band7 | 2850 | 398 | | | | | | |
| 2019.07.02 16:26:37.06 | | | | 2850 | 54 | Handover | | | |
| 2019.07.02 16:26:37.15 | | | | | | | | | |
| 2019.07.02 16:26:37.15 | | | | | | | | | |
| 2019.07.02 16:26:37.19 | | | | | | | | | |
| 2019.07.02 16:26:38.00 | Band7 | 2850 | 54 | | | | | | |
| 2019.07.02 16:26:39.00 | Band7 | 2850 | 54 | | | | | | |
| 2019.07.02 16:26:39.53 | | | | | | | | | |
| 2019.07.02 16:26:39.59 | | | | | | | | | |
| 2019.07.02 16:26:40.00 | Band7 | 2850 | 54 | | | | | | |
| 2019.07.02 16:26:41.00 | Band7 | 2850 | 54 | | | | | | |
| 2019.07.02 16:26:42.00 | Band7 | 2850 | 54 | | | | | | |
| 2019.07.02 16:26:43.00 | Band7 | 2850 | 54 | | | | | | |
| 2019.07.02 16:26:44.00 | Band7 | 2850 | 54 | | | | | | |
| 2019.07.02 16:26:45.00 | Band7 | 2850 | 54 | | | | | | |
| 2019.07.02 16:26:45.26 | | | | | | | 8.283 | 2850/54 to 2850/92 | |

| TIME_STAMP | Compare | | | | | | | | |
|---|---|---|---|---|---|---|---|---|---|
| | Band | EARFCN | PCI | Event Report Frequency | Event Report Physical Cell ID | Event Report New Cell Cause | HO Attempt Time Diff | HO Source to Target Info | PPHO |
| 2019.07.02 16:26:30.45 | | | | | | | | | |
| 2019.07.02 16:26:31.00 | Band3 | 1350 | 398 | | | | | | |
| 2019.07.02 16:26:31.09 | | | | | | | | | |
| 2019.07.02 16:26:31.61 | | | | | | | 87.956 | 1350/398 to1350/54 | |
| 2019.07.02 16:26:31.70 | | | | | | | | | |
| 2019.07.02 16:26:31.95 | | | | 1350 | 54 | Handover | | | |
| 2019.07.02 16:26:32.00 | Band3 | 1350 | 54 | | | | | | |
| 2019.07.02 16:26:32.62 | | | | | | | | | |
| 2019.07.02 16:26:33.00 | Band3 | 1350 | 54 | | | | | | |
| 2019.07.02 16:26:33.01 | | | | | | | | | |
| 2019.07.02 16:26:33.15 | | | | | | | | | |
| 2019.07.02 16:26:33.51 | | | | | | | 1.905 | 1350/54 to1350/398 | |
| 2019.07.02 16:26:33.57 | | | | 1350 | 398 | Handover | | | |
| 2019.07.02 16:26:34.00 | Band3 | 1350 | 398 | | | | | | |
| 2019.07.02 16:26:34.57 | | | | | | | | | |
| 2019.07.02 16:26:34.66 | | | | | | | | | |
| 2019.07.02 16:26:35.00 | Band3 | 1350 | 398 | | | | | | |
| 2019.07.02 16:26:35.35 | | | | | | | | | |
| 2019.07.02 16:26:35.46 | | | | | | | | | |
| 2019.07.02 16:26:36.00 | Band3 | 1350 | 398 | | | | | | |
| 2019.07.02 16:26:36.46 | | | | | | | 2.953 | 1350/398 to1350/92 | |
| 2019.07.02 16:26:36.98 | | | | | | | | | |
| 2019.07.02 16:26:37.00 | Band3 | 1350 | 92 | | | | | | |
| 2019.07.02 16:26:37.06 | | | | | | | | | |
| 2019.07.02 16:26:37.15 | | | | 1350 | 92 | Handover | | | |
| 2019.07.02 16:26:37.15 | | | | | | | 0.687 | 1350/92 to1350/54 | PPHO(1350/54↔1350/398↔1350/54) |
| 2019.07.02 16:26:37.19 | | | | 1350 | 54 | Handover | | | |
| 2019.07.02 16:26:38.00 | Band3 | 1350 | 54 | | | | | | |
| 2019.07.02 16:26:39.00 | Band3 | 1350 | 54 | | | | | | |
| 2019.07.02 16:26:39.53 | | | | | | | 2.374 | 1350/54 to1350/92 | PPHO(1350/92↔1350/54) |
| 2019.07.02 16:26:39.59 | | | | 1350 | 92 | Handover | | | |
| 2019.07.02 16:26:40.00 | Band3 | 1350 | 92 | | | | | | |
| 2019.07.02 16:26:41.00 | Band3 | 1350 | 92 | | | | | | |
| 2019.07.02 16:26:42.00 | Band3 | 1350 | 92 | | | | | | |
| 2019.07.02 16:26:43.00 | Band3 | 1350 | 92 | | | | | | |
| 2019.07.02 16:26:44.00 | Band3 | 1350 | 92 | | | | | | |
| 2019.07.02 16:26:45.00 | Band3 | 1350 | 92 | | | | | | |
| 2019.07.02 16:26:45.26 | | | | | | | | | |

FIG. 7

| | |
|---|---|
| 2016-10-27 16:04:10.087507 | No Service |
| 2016-10-27 16:04:11.269486 | No Service |
| 2016-10-27 16:04:12.466852 | No Service |
| 2016-10-27 16:04:12.998583 | Service Available |

FIG. 8

| | | 810 Reference | 830 Compare |
|---|---|---|---|
| Scroing | | 100.00 | 100.00 |
| No Service Ratio (%) | | 0.00 | 0.00 |
| Total Time (sec) | | 11788.47 | 11788.19 |
| No Service Time (sec) | Total No Service duration | 0.00 | 0.00 |
| | No Service Duration (Max) | 0.00 | 0.00 |
| | No Service Duration (Min) | 0.00 | 0.00 |
| | No Service Duration (Avg) | 0.00 | 0.00 |

COMMUNICATION APPARATUS FOR VEHICLE AND METHOD OF EVALUATING COMMUNICATION PERFORMANCE THEREOF

CROSS REFERENCE TO RELATED APPLICATIONS

The present application claims priority of Korean Patent Application No. 10-2023-0108444 filed on Aug. 18, 2023, the entire contents of which is incorporated herein for all purposes by this reference.

BACKGROUND

Field of the Disclosure

The present disclosure relates to a communication apparatus for a vehicle, and more specifically, to an apparatus for quantitatively evaluating performance of communication with a network and a method of evaluating performance of the apparatus.

Description of the Related Art

"Infotainment" is a compound of "information" and "entertainment". In particular, infotainment for a vehicle has been in the spotlight as an application service for a next-generation vehicle with the help of the popularity of smartphones. Infotainment collectively refers to an environment within a vehicle, which can simultaneously serve driving-related information and things to enjoy to a passenger.

As the application of connected cars is expanded globally and online connection services of connected cars, such as navigation, a real-time video streaming service, an over the air (OTA) download service, safe security, and the provision of information through server voice recognition, are increased, the importance of performance evaluation on the online connection services comes to the fore. In particular, it is important to provide a conventional audio video navigation telematics (AVNT) OTA service and to also maintain the matching and reliability of performance of communication with a communication network while a controller within a vehicle is updated through controller OTA.

Conventionally, network performance evaluation was performed by aggregating the number of successes according to the number of attempts through the simple repetition of a data call or a voice call. A lot of time was assigned to the debugging of network performance evaluation. Furthermore, if communication fails due to a simple network problem, such fail affects the results of the network performance evaluation. Accordingly, quantitative evaluation data may result in the derivation of different results depending on environments, such as an evaluation condition, an evaluator, an evaluation time, and an evaluation place. If performance evaluation cannot be performed again even after a problem occurs, it is difficult to accurately check whether network performance has been improved. For this reason, it is not easy to immediately handle an issue occurred within a modem or to rapidly solve a problem. Furthermore, there is a difficulty in that an arrangement between a performance evaluator and a developer of a system or modem is delayed.

Accordingly, the present technical field requires a technology capable of stably securing performance of a modem by quantitatively evaluating the robustness and stability of interlocking performance between a communication network and the modem of an AVNT terminal.

SUMMARY

The present disclosure is directed to providing a communication apparatus for a vehicle, which can quantitatively evaluate the robustness and stability of interlocking performance between a communication network and the modem of an AVNT terminal, and a method of evaluating performance of the communication apparatus.

The present disclosure is directed to inducing the effective and active correspondence of a system developer by reducing manpower and time for communication network interlocking performance evaluation in an online service and objectively evaluating communication network interlocking performance.

The present disclosure is directed to providing a method of quantitatively evaluating performance of a modem, which may be interpreted as clear numerical values.

The present disclosure is directed to providing a rational and objective performance evaluation method which may be agreed by both a performance evaluator and a system developer.

Technical objects to be achieved in the present disclosure are not limited to the aforementioned objects, and other objects that are not mentioned will be able to be clearly understood by those skilled in the art to which the present disclosure pertains from the following description.

A method of evaluating performance of a communication apparatus for a vehicle according to an embodiment of the present disclosure may include performing communication with a base station, monitoring a fail event and determining a fail event score based on results of the monitoring, monitoring an attempt of a handover and determining a pingpong handover (PPHO) score based on results of the monitoring, monitoring a retention time within a shadow area and determining a service score based on results of the monitoring, and determining a final score based on the fail event score, the PPHO score, and the service score.

In this case, the determining of the fail event score may include generating a communication measurement log based on the results of the monitoring of the fail event and determining the fail event score based on the communication measurement log.

In this case, the determining of the fail event score may include dividing a driving route of a vehicle generated based on the communication measurement log into a plurality of binning distances having preset arbitrary intervals, and determining the fail event score by considering, as one fail event, a plurality of same fail events that overlap and occur within one divided binning distance.

In this case, the fail event score may be determined by subtracting a preset value from an initial value that has been arbitrarily set based on a fail event parameter included in the communication measurement log.

In this case, the fail event parameter may include at least one of "RLF", "Continuous Weak SINR", "310_Expiry", "RRE Reject", "RACH_PROBLEM", "MAX_RETRX", "rlc_MaxNumRetx", "randomAccessProblem", and "SIB_READ_FAILURE".

In this case, the PPHO score may be determined by subtracting a value that has been preset in a PPHO or a pattern PPHO from an initial value that has been arbitrarily set when the PPHO or the pattern PPHO occurs.

In this case, the PPHO may be determined to have occurred when a source physical cell identifier (PCI), that is, a PCI of a source cell, before at least one handover is performed and a target PCI, that is, a PCI of a target cell, after the handover is finally performed are identical with each other and an interval between attempts of the handover is less than a first threshold time, when the handover is performed.

In this case, the pattern PPHO may be determined to have occurred when the source PCI and the target PCI are identical with each other and an interval between attempts of the handover is equal to or greater than the first threshold time and is less than a second threshold time, when the handover is performed.

In this case, the service score may be determined based on a ratio of the retention time within the shadow area, in which the communication apparatus for a vehicle enters the shadow area in which communication with the base station is impossible and maintains the state in which the communication is impossible, to an entire call measurement time of the communication apparatus for a vehicle.

In this case, the final score may be obtained by incorporating each of the fail event score, the PPHO score, and the service score at an arbitrary ratio and summing the fail event score, the PPHO score, and the service score.

A communication apparatus for a vehicle according to an embodiment of the present disclosure may include a communication unit configured to perform communication with a base station, and a processor configured to monitor a fail event, determine a fail event score based on results of the monitoring of the fail event, monitor an attempt of a handover, determine a pingpong handover (PPHO) score based on results of the monitoring of the attempt of the handover, monitor a retention time within a shadow area, determine a service score based on results of the monitoring of the retention time, and determine a final score based on the fail event score, the PPHO score, and the service score.

In this case, the processor may generate a communication measurement log based on the results of the monitoring of the fail event, and may determine the fail event score based on the communication measurement log.

In this case, the processor may divide a driving route of a vehicle generated based on the communication measurement log into a plurality of binning distances having preset arbitrary intervals, and may determine the fail event score by considering, as one fail event, a plurality of same fail events that overlap and occur within one divided binning distance.

In this case, the fail event score may be determined by subtracting a preset value from an initial value that has been arbitrarily set based on a fail event parameter included in the communication measurement log.

In this case, the fail event parameter may include at least one of "RLF", "Continuous Weak SINR", "310_Expiry", "RRE Reject", "RACH_PROBLEM", "MAX_RETRX", "rlc_MaxNumRetx", "randomAccessProblem", and "SIB_READ_FAILURE".

In this case, the processor may determine the PPHO score by subtracting a value that has been preset in a PPHO or a pattern PPHO from an initial value that has been arbitrarily set when the PPHO or the pattern PPHO occurs.

In this case, the PPHO may be determined to have occurred when a source physical cell identifier (PCI), that is, a PCI of a source cell, before at least one handover is performed and a target PCI, that is, a PCI of a target cell, after the handover is finally performed are identical with each other and an interval between attempts of the handover is less than a first threshold time, when the handover is performed.

In this case, the pattern PPHO may be determined to have occurred when the source PCI and the target PCI are identical with each other and an interval between attempts of the handover is equal to or greater than the first threshold time and is less than a second threshold time, when the handover is performed.

In this case, the service score may be determined based on a ratio of the retention time within the shadow area, in which the communication apparatus for a vehicle enters the shadow area in which communication with the base station is impossible and maintains the state in which the communication is impossible, to an entire call measurement time of the communication apparatus for a vehicle.

In this case, the final score may be obtained by incorporating each of the fail event score, the PPHO score, and the service score at an arbitrary ratio and summing the fail event score, the PPHO score, and the service score.

According to the aforementioned various embodiments of the present disclosure, it is possible to quantitatively evaluate the robustness and stability of interlocking performance between a communication network and the modem of an AVNT terminal.

Furthermore, the effective and active correspondence of a system developer can be induced by reducing manpower and time for communication network interlocking performance evaluation in an online service and objectively evaluating communication network interlocking performance.

Furthermore, a method of quantitatively evaluating performance of a modem, which may be interpreted as clear numerical values, can be provided.

Furthermore, a rational and objective performance evaluation method which may be agreed by both a performance evaluator and a system developer is provided.

Furthermore, the results of reliable modem performance evaluation are derived by simultaneously comparing performance of communication with a network with a comparative group, securing the discrimination and fairness of a network issue, and selecting a factor having direct and indirect influences on a field issue in evaluating performance of communication with a network.

Furthermore, the scored and quantitative results of evaluation can be obtained by applying root cause analysis (RCA).

Furthermore, the reliability of the evaluation of performance of communication with a network is secured by selecting a determination criterion according to a performance index and introducing a score subtraction method in a shadow area.

The effects obtainable from the present disclosure are not limited to the above-described effects, and other effects that are not mentioned will be able to be clearly understood by those skilled in the art to which the disclosure pertains from the following description.

BRIEF DESCRIPTION OF THE FIGURES

The above and other objects, features and other advantages of the present disclosure will be larger clearly understood from the following detailed description when taken in conjunction with the accompanying drawings, in which:

FIG. 3 is a block diagram schematically illustrating a construction of a communication apparatus for a vehicle according to an embodiment of the present disclosure.

FIG. 5 illustrates an example in which a fail event score according to a fail event parameter according to an embodiment of the present disclosure is subtracted.

FIGS. 6A and 6B illustrate examples of a field log of another terminal for determining a PPHO or a pattern PPHO and a field log that is collected from the communication apparatus for a vehicle according to an embodiment of the present disclosure.

FIG. 7 illustrates an example of a method of determining a retention time within a shadow area based on a communication measurement log of the communication apparatus for a vehicle according to an embodiment of the present disclosure.

FIG. 8 illustrates an example of service scores according to the ratio of a retention time within a shadow area according to an embodiment of the present disclosure.

DETAILED DESCRIPTION

Figure 1:
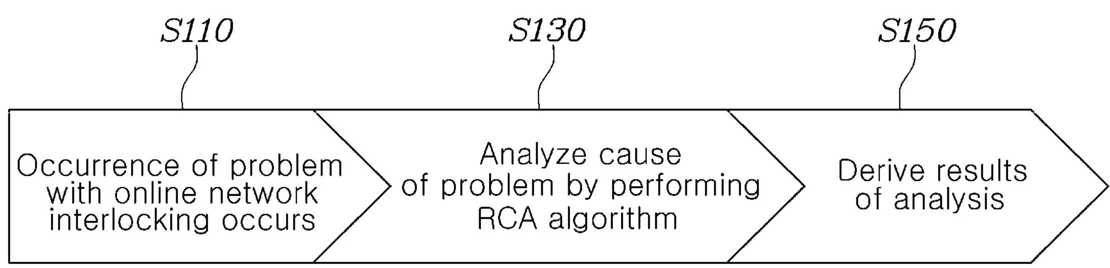
FIG. 1 illustrates an example of a method of analyzing a cause of a network interlocking problem with an online service of a common network system.

Hereinafter, embodiments disclosed in this specification are described in detail with reference to the accompanying drawings. The same or similar component is assigned the same reference numeral regardless of its reference numeral, and a redundant description thereof is omitted. It is to be noted that the suffixes of components used in the following description, such as a "module" and a "unit", are assigned or interchangeable with each other by taking into consideration only the case of writing this specification, but in themselves are not particularly given distinct meanings and roles. Furthermore, in describing an embodiment disclosed in this specification, when it is determined that a detailed description of a related known technology may obscure the subject matter of an embodiment disclosed in this specification, the detailed description will be omitted. Furthermore, it is to be understood that the accompanying drawings are merely intended to make easily understood the embodiments disclosed in this specification, and the technical spirit disclosed in this specification is not restricted by the accompanying drawings and includes all changes, equivalents, and substitutions which fall within the spirit and technical scope of this specification.

Terms including ordinal numbers, such as a "first" and a "second", may be used to describe various components, but the components are not restricted by the terms. The terms are used to only distinguish one component from the other components.

When it is described that one component is "connected" or "coupled" to the other component, it should be understood that one component may be directly connected or coupled to the other component, but a third component may exist between the two components. In contrast, when it is described that one component is "directly connected" or "directly coupled" to the other component, it should be understood that a third component does not exist between the two components.

An expression of the singular number includes an expression of the plural number unless clearly defined otherwise in the context.

In this specification, it is to be understood that a term, such as "include" or "have", is intended to designate that a characteristic, a number, a step, an operation, a component, a part or a combination of them described in the specification is present, and does not exclude the presence or addition possibility of one or more other characteristics, numbers, steps, operations, components, parts, or combinations of them in advance.

FIG. 1 illustrates an example of a method of analyzing a cause of a network interlocking problem with an online service of a common network system.

Referring to FIG. 1, when a problem with online network interlocking occurs at S110, a cause of the problem is analyzed at S130 by performing a root cause analysis (RCA) algorithm, and the results of the analysis are derived at S150.

Figure 2:
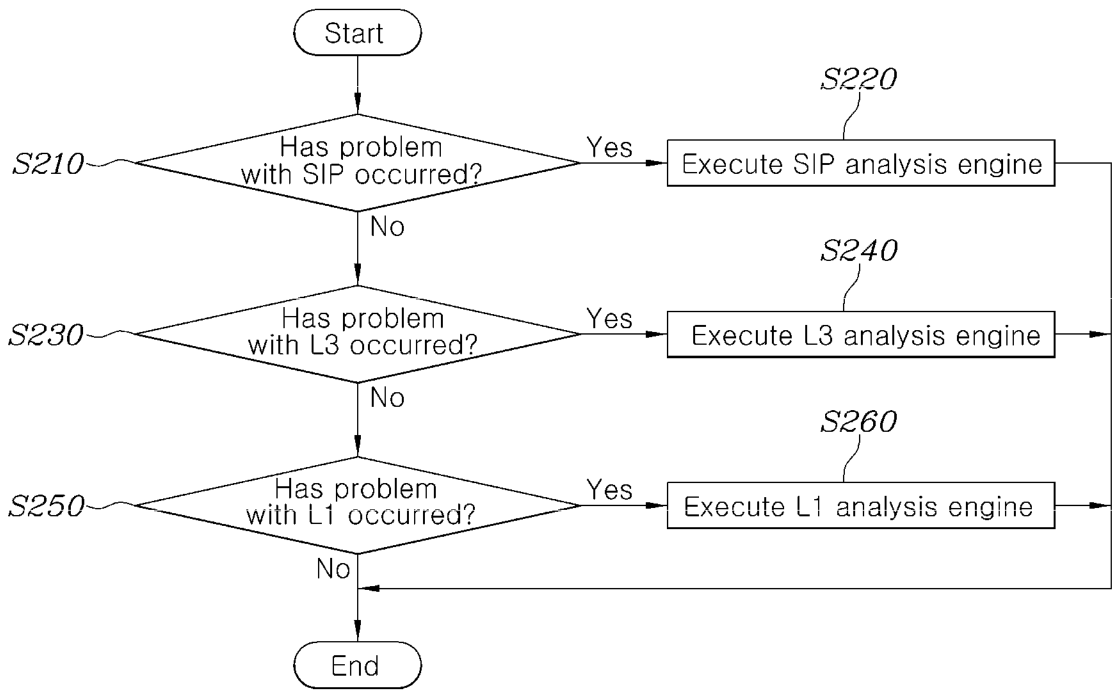
FIG. 2 is a flowchart illustrating a detailed example of a step of performing an RCA algorithm in FIG. 1.

FIG. 2 is a flowchart illustrating a detailed example of the step of performing an RCA algorithm in FIG. 1.

Referring to FIG. 2, the step of performing the RCA algorithm includes a step S210 of determining whether a problem with a session initiation protocol (SIP) has occurred and a step S220 of executing an SIP analysis engine if the problem with the SIP has occurred.

Furthermore, the step of performing the RCA algorithm includes a step S230 of determining whether a problem with L3, that is, a network layer, has occurred, if a problem has not occurred in the SIP as the results of the determination in step S210, and a step S240 of executing an L3 analysis engine if the problem has occurred in L3.

In this case, the L3 analysis engine may include a radio resource control (RRC) analysis engine and a non-access stratum (NAS) analysis engine.

Furthermore, the step of performing the RCA algorithm includes a step S250 of determining whether a problem with L1, that is, a physical layer, has occurred, if a problem has not occurred in L3 as the results of the determination in step S230 and a step S260 of executing an L1 analysis engine if the problem has occurred in L1.

Figure 3:
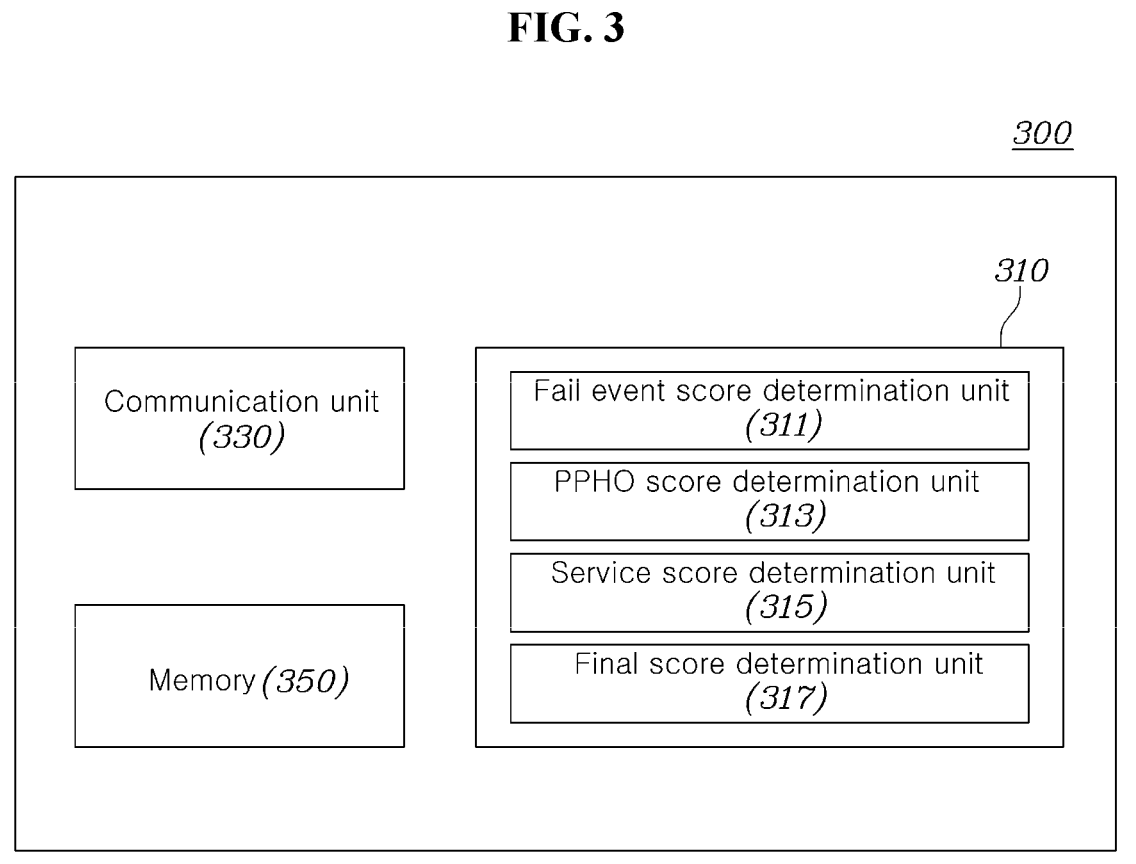

FIG. 3 is a block diagram schematically illustrating a construction of a communication apparatus 300 for a vehicle according to an embodiment of the present disclosure.

Referring to FIG. 3, the communication apparatus 300 for a vehicle according to the present disclosure includes a processor 310, a communication unit 330, and memory 350.

In this case, the communication apparatus 300 for a vehicle may be an audio video navigation telematics (AVNT) terminal installed in a vehicle.

The processor 310 may include an application-specific integrated circuit (ASIC), another chipset, a logic circuit and/or a data processing device. The processor 310 implements a method of evaluating performance of a communication apparatus for a vehicle that is proposed in this specification. Specifically, in an embodiment disclosed in this specification, the processor 310 quantitatively evaluates performance of online network interlocking services, such as navigation, voice recognition, and real-time video streaming which are measured when the vehicle in which the communication apparatus 300 for a vehicle has been installed travels.

In this case, the processor 310 may receive a score that is obtained by quantitatively evaluating performance of an online network interlocking service for another terminal from the communication unit 330, and may compare the received score with the score obtained by evaluating performance of the communication apparatus 300 for a vehicle.

In this case, another terminal may be an AVNT terminal installed in another vehicle that has a driving route closest to a vehicle in which the communication apparatus 300 for a vehicle has been installed or that has a high ratio of a driving route that overlaps that of the vehicle in which the communication apparatus 300 for a vehicle has been installed, or may be an AVNT terminal installed in another vehicle that is the closest to a location of the communication apparatus 300 for a vehicle.

The processor 310 includes a fail event score determination unit 311, a pingpong handover (PPHO) score determination unit 313, a service score determination unit 315, and a final score determination unit 317.

The fail event score determination unit 311 performs communication with a base station through the communication unit 330, and monitors a fail event.

In this case, a fail event may occur when the fail event score determination unit 311 receives an HKDM L3 message.

In this case, the fail event score determination unit 311 may generate a communication measurement log based on the results of the monitoring of the fail event.

In this case, the fail event score determination unit 311 may divide a driving route generated based on the communication measurement log into a plurality of binning distances on the basis of a preset arbitrary criterion, and subtracts a fail event score by considering, as one fail event, a plurality of same fail events that overlap and occur within one divided binning distance.

Figure 4A:
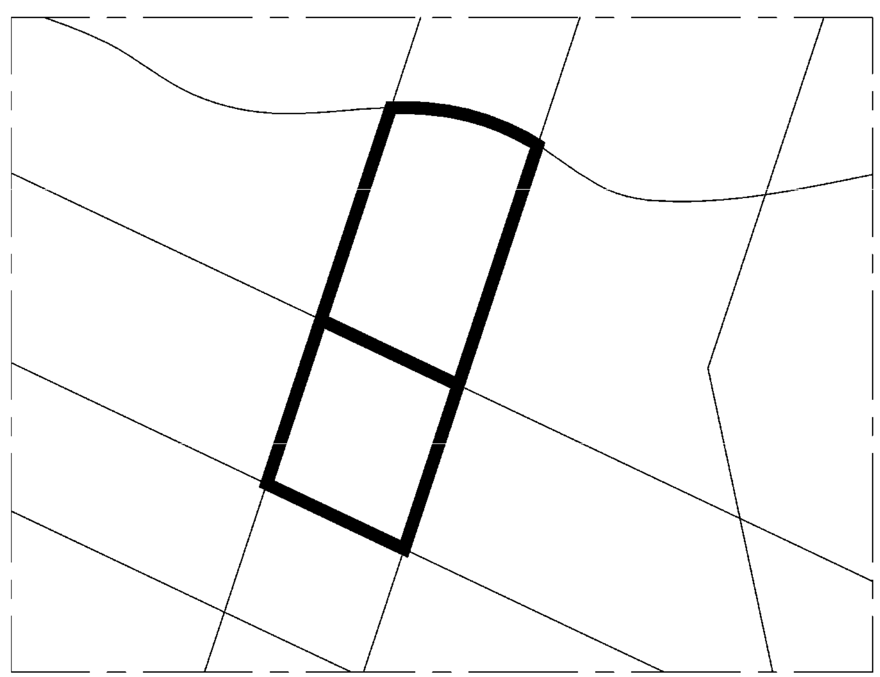
FIG. 4A illustrates an example of the entire driving route of a vehicle according to an embodiment of the present disclosure.
Figure 4B:
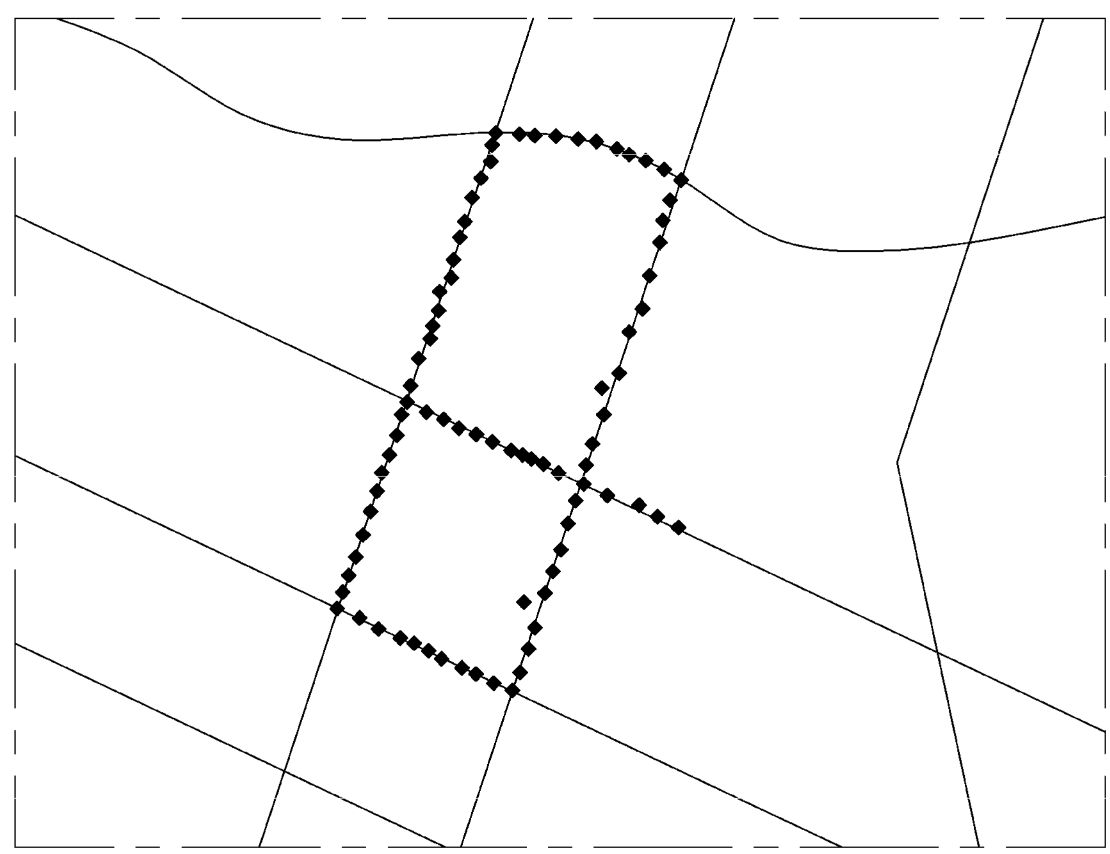
FIG. 4B illustrates an example in which the entire driving route of the vehicle in FIG. 4A is divided into a plurality of binning distances.

For example, the fail event score determination unit 311 may divide the entire driving route indicated by a thick line in FIG. 4A into a plurality of binning distances at intervals of 30 m as in FIG. 4B, and may subtract a fail event score by considering, as one fail event, a plurality of same fail events that overlap and occur within one divided binning distance.

In this case, an arbitrary value may be set as an initial value of the fail event score. The initial value may be set to 100, for example.

In this case, the fail event score may be determined based on a fail event occurrence history that is detected based on fail event parameters within a communication measurement log.

In this case, the fail event score determination unit 311 may classify event occurrence conditions in order to secure fairness between another terminal and the communication apparatus 300 for a vehicle.

In this case, the fail event parameters may include at least one of "RLF", "Continuous Weak SINR", "310_Expiry", "RRE Reject", "RACH_PROBLEM", "MAX_RETRX", "rlc_MaxNumRetx", "randomAccessProblem", and "SIB_READ_FAILURE", for example.

In this case, the fail event score determination unit 311 may subtract the fail event score by a different value for each fail event parameter. For example, in the case of "RLF", the fail event score may be subtracted by 0.5. In the case of "Continuous Weak SINR", the fail event score may be subtracted by 0.1. In the case of "310_Expiry", the fail event score may be subtracted by 0.5. In the case of "RRE Reject", the fail event score may be subtracted by 0.5. In the case of "RACH_PROBLEM", the fail event score may be subtracted by 0.5. In the case of "MAX_RETRX", the fail event score may be subtracted by 0.5. In the case of "rlc_MaxNumRetx", the fail event score may be subtracted by 0.5. In the case of "randomAccessProblem", the fail event score may be subtracted by 0.5. In the case of "SIB_READ_FAILURE", the fail event score may be subtracted by 5.

FIG. 5 illustrates an example in which a fail event score according to a fail event parameter according to an embodiment of the present disclosure is subtracted.

In FIG. 5, a reference terminal fail event log 510 indicates a fail event occurrence history of another terminal. A comparison terminal fail event log 530 indicates a score obtained by evaluating, by the communication apparatus 300 for a vehicle, performance of an online network interlocking service based on a fail event parameter that is detected from a communication measurement log for measuring communication performance.

Referring to FIG. 5, it may be seen that the fail event score determination unit 311 may compare a fail event score according to a fail event parameter of the communication apparatus 300 for a vehicle and a fail event score of another terminal that is performing communication at a location close to the communication apparatus 300 for a vehicle.

Referring back to FIG. 3, the PPHO score determination unit 313 monitors the number of times that the communication apparatus 300 for a vehicle performs a PPHO for a predetermined time, and subtracts a PPHO score based on the number of times.

In this case, the PPHO is a phenomenon in which networks are frequently exchanged within a short time, and may mean that a handover is repeatedly performed between a source cell that provides a service to a terminal and a target cell that will provide a service to the terminal.

A frequent PPHO affects network interlocking performance, may degrade performance of an online service. In order to determine whether a frequent PPHO results from a problem with a communication network or a problem with a terminal, a PPHO score of another terminal and a PPHO score of the communication apparatus 300 for a vehicle may be compared and made quantitative.

In this case, when an interval between the attempts of a handover is less than a first threshold time, the handover may be determined as a PPHO. When the interval between the attempts of the handover is equal to or greater than the first threshold time and is less than a second threshold time, the handover may be determined as a pattern PPHO.

In this case, each of the first and second threshold times may be a time that has been arbitrarily set. For example, the first threshold time may be set to 1 second, and the second threshold time may be set to 5 seconds.

In this case, the PPHO score determination unit 313 may determine whether a PPHO or a pattern PPHO occurs based on a field log that is collected as the results of communication of the communication unit 330 with a base station.

In this case, if a source physical cell identifier (PCI), that is, the PCI of the source cell, before the handover is performed and a target PCI, that is, the PCI of the target cell, after the handover is finally performed are identical with each other, the handover may be determined as the PPHO or the pattern PPHO.

Furthermore, if an evolved absolute radio frequency channel number (EARFCN) of the source cell and the EARFCN of the target cell are different from each other, the handover may be determined to be not the PPHO or the pattern PPHO.

In this case, the EARFCN indicates uplink and downlink channels that are used for the base station and the terminal to communicate with each other. In order to prevent crosstalk occurring because neighbor cells transmit signals through similar channels, the base station provides services by using a different ARFCN for each sector.

Accordingly, if the sectors of the source cell and the target cell are different from each other, the handover may be determined to be not the PPHO or the pattern PPHO.

In this case, an arbitrary value may be set as an initial value of the PPHO score. The initial value may be set to 100, for example.

The PPHO score determination unit 313 may subtract the PPHO score by the same score or a different score with respect to the PPHO or the pattern PPHO. For example, the PPHO score determination unit 313 may subtract the PPHO score with respect to the PPHO or the pattern PPHO on the basis of a criterion defined in Table 1.

TABLE 1

| TYPE OF HANDOVER | DEDUCTION SCORE |
|---|---|
| PPHO | −0.3 |
| Pattern PPHO | −0.3 |

FIGS. 6A and 6B illustrate examples of a field log of another terminal for determining a PPHO or a pattern PPHO and a field log that is collected from the communication apparatus for a vehicle according to an embodiment of the present disclosure. A reference terminal field log 610 illustrated in FIG. 6A indicates a field log of another terminal. A comparison terminal field log 630 illustrated in FIG. 6B indicates a field log of the communication apparatus 300 for a vehicle.

Referring to FIGS. 6A and 6B, it may be seen that the PPHO score determination unit 313 may determine whether a PPHO or a pattern PPHO occurs based on the reference terminal field log 610 and the field log 630 of the communication apparatus 300 for a vehicle.

Referring back to FIG. 3, the service score determination unit 315 determines a service score by calculating the ratio of a retention time within a shadow area in which the communication apparatus 300 for a vehicle enters the shadow area in which communication with a network, that is, a base station, is impossible and maintains the state in which the communication is impossible, compared to the entire call measurement time of the communication apparatus 300 for a vehicle.

In this case, the ratio of the retention time within the shadow area may be calculated by Equation 1:

$$NoServiceRatio(\%) = (\text{retention time within shadow area/call measurement time}) * 100$$

In Equation 1, the No Service Ratio indicates the ratio of the retention time within the shadow area.

For example, referring to FIG. 7, the retention time within the shadow area may be calculated as a period from timing at which a value indicating that a communication service is impossible is written in a parameter indicative of a communication state to timing at which a value indicating that the communication service is possible is written in the parameter, within the communication measurement log of the communication apparatus 300 for a vehicle.

For example, the parameter indicative of the communication state may be a CM state info Service State parameter. The value indicating that the communication service is impossible may be "No service". The value indicating that the communication service is possible may be "Service Available".

FIG. 8 illustrates an example of service scores according to the ratio of a retention time within a shadow area according to an embodiment of the present disclosure.

In FIG. 8, reference terminal shadow area data 810 indicate a service score according to a retention time within a shadow area for another terminal. Comparison terminal shadow area data 830 indicate a service score according to a retention time within a shadow area for the communication apparatus 300 for a vehicle. Referring to FIG. 8, it may be seen that both the service scores for another terminal and the communication apparatus 300 for a vehicle may have a value of 100 when both another terminal and the communication apparatus 300 for a vehicle are placed in a serviceable area during the entire time.

Referring back to FIG. 3, the final score determination unit 317 determines the final score relating to network interlocking performance of the communication apparatus 300 for a vehicle, based on the fail event score determined by the fail event score determination unit 311, the PPHO score determined by the PPHO score determination unit 313, and the service score determined by the service score determination unit 315.

In this case, the final score determination unit 317 may determine the final score by incorporating each of the fail event score, the PPHO score, and the service score at an arbitrary ratio and summing the fail event score, the PPHO score, and the service score.

For example, the final score determination unit 317 may determine the final score based on Table 2.

TABLE 2

| SCORING ITEMS | INCORPORATED RATIO | NOTES |
|---|---|---|
| FAIL EVENT SCORE | 50% | Incorporate reliability of modem performance evaluation according to a field issue |
| PPHO SCORE | 20% | Incorporate the influence of performance on an issue not confirmed as an event |
| SERVICE SCORE | 30% | Incorporate an error of performance evaluation attributable to a shadow area (No Service) |

Referring to Table 2, it may be seen that the final score determination unit 317 may determine the final score by incorporating the fail event score, the PPHO score, and the service score by 50%, 20%, and 30%, respectively. However, the ratios are merely examples, and may be set as various ratios depending on a user's choice.

The final score determined by the final score determination unit 317 may be used at various places.

For example, when the final score is lower than a threshold score, the communication apparatus 300 for a vehicle may provide the final score to a manager of a base station so that the manager can monitor communication quality by transmitting the final score to the base station.

Furthermore, when the final score of the communication apparatus 300 for a vehicle is lower than the final score of another terminal nearby by a threshold or more, the communication apparatus 300 for a vehicle may transmit the final score to the manufacturer of a vehicle or the server or terminal of a service manager so that the manufacturer of the vehicle or the service manager can update software of a modem or controller of the vehicle or check the modem or the controller.

The communication unit 330 is connected to the processor 310, and transmits and/or receives all types of information for implementing the method of evaluating performance of a communication apparatus for a vehicle. For example, the communication unit 330 may receive a score that is obtained by quantitatively evaluating performance of an online network interlocking service for another terminal.

Furthermore, the communication unit 330 may receive a message for communication performance measurement for generating a communication measurement log from a base station.

In this case, the communication measurement log may include a fail event message for determining a fail event score.

In this case, the message for the communication performance measurement may be an HKDM L3 message.

Furthermore, the communication unit 330 may collect a field log for generating a PPHO score through communication with the base station.

Furthermore, the communication unit 330 may collect the communication measurement log for generating a service score through communication with the base station.

The memory 350 may include read-only memory (ROM), random access memory (RAM), flash memory, a memory card, a storage medium and/or another storage device. The memory 350 stores information for implementing the communication apparatus for a vehicle and the method of evaluating performance of the communication apparatus. For example, the memory 350 stores at least one of the fail event score, the PPHO score, and the service score, or the final score, or a combination of them.

Figure 9:
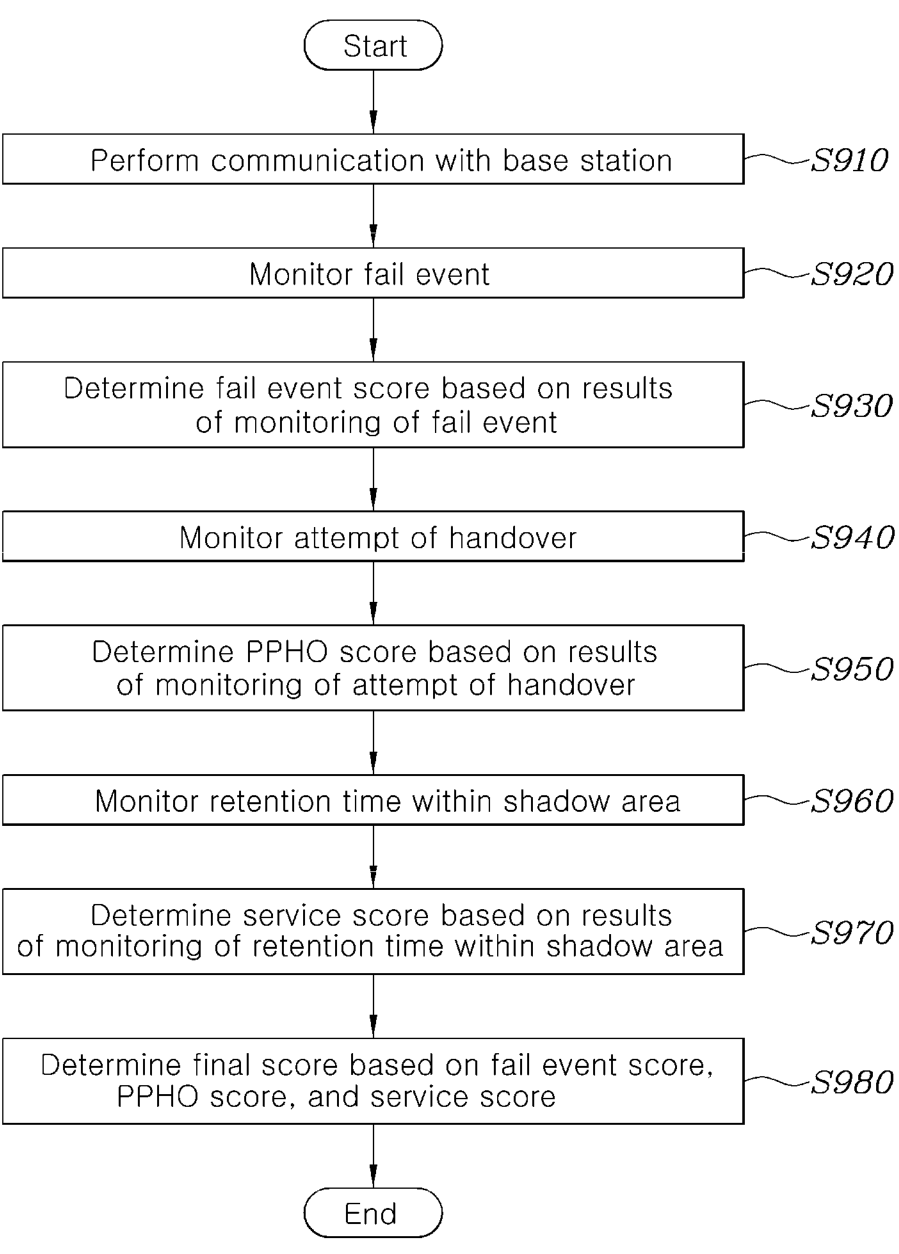
FIG. 9 is a flowchart illustrating a method of evaluating performance of the communication apparatus for a vehicle according to an embodiment of the present disclosure.

FIG. 9 is a flowchart illustrating the method of evaluating performance of the communication apparatus for a vehicle according to an embodiment of the present disclosure.

The method of evaluating performance of the communication apparatus for a vehicle according to the present disclosure may be performed by the communication apparatus 300 for a vehicle according to the embodiment of FIG. 3.

Referring to FIG. 9, the communication apparatus 300 for a vehicle performs communication with a base station at S910.

Furthermore, the communication apparatus 300 for a vehicle monitors a fail event at S920.

Furthermore, the communication apparatus 300 for a vehicle determines a fail event score based on the results of the monitoring of the fail event at S930.

In this case, the communication apparatus 300 for a vehicle may generate a communication measurement log based on the results of the monitoring of the fail event, and may determine the fail event score based on the communication measurement log.

In this case, the communication apparatus 300 for a vehicle may divide a driving route of a vehicle, which is generated based on the communication measurement log, into a plurality of binning distances having preset arbitrary intervals, and may determine the fail event score by considering, as one fail event, a plurality of same fail events that overlap and occur within one divided binning distance.

In this case, the fail event score may be determined by subtracting a preset value from an initial value that has been arbitrarily set, based on a fail event parameter included in the communication measurement log.

In this case, the fail event parameter may include at least one of "RLF", "Continuous Weak SINR", "310_Expiry", "RRE Reject", "RACH_PROBLEM", "MAX_RETRX", "rlc_MaxNumRetx", "randomAccessProblem", and "SIB_READ_FAILURE".

Furthermore, the communication apparatus 300 for a vehicle monitors the attempt of a handover at S940.

Furthermore, the communication apparatus 300 for a vehicle determines a PPHO score based on the results of the monitoring of the attempt of the handover at S950.

In this case, the PPHO score may be determined by subtracting a preset value of a PPHO or a pattern PPHO from the initial value that has been arbitrarily set when the PPHO or the pattern PPHO occurs.

In this case, the PPHO may be determined to have occurred when a source physical cell identifier (PCI), that is, the PCI of a source cell, before at least one handover is performed and a target PCI, that is, the PCI of a target cell, after the handover is finally performed are identical with each other and an interval between the attempts of the handover is less than a first threshold time, when the handover is performed.

In this case, the pattern PPHO may be determined to have occurred when the source PCI and the target PCI are identical with each other and the interval between the attempts of the handover is equal to or greater than the first threshold time and is less than a second threshold time, when the handover is performed.

Furthermore, the communication apparatus 300 for a vehicle monitors a retention time within a shadow area at S960.

Furthermore, the communication apparatus 300 for a vehicle determines a service score based on the results of the monitoring of the retention time within the shadow area at S970.

In this case, the service score may be determined based on the ratio of the retention time within the shadow area, in which the communication apparatus for a vehicle enters the shadow area in which communication with the base station is impossible and maintains the state in which the communication is impossible, compared to the entire call measurement time of the communication apparatus for a vehicle.

Furthermore, the communication apparatus 300 for a vehicle determines the final score based on the fail event score, the PPHO score, and the service score at S980.

In this case, the final score may be obtained by incorporating each of the fail event score, the PPHO score, and the service score at an arbitrary ratio and summing the fail event score, the PPHO score, and the service score.

According to the aforementioned embodiments of the present disclosure, the robustness and stability of interlocking performance between a communication network and the modem of an AVNT terminal can be quantitatively evaluated.

Furthermore, the effective and active correspondence of a system developer can be induced by reducing manpower and time for communication network interlocking performance evaluation in an online service and objectively evaluating communication network interlocking performance.

Furthermore, the method of quantitatively evaluating performance of a modem, which may be interpreted as clear numerical values, can be provided.

Furthermore, the rational and objective method of evaluating communication network interlocking performance, which can be agreed by both a performance evaluator and a system developer, is provided.

Furthermore, the results of reliable modem performance evaluation are derived by simultaneously comparing performance of communication with a network with a comparative group, securing the discrimination and fairness of a network issue, and selecting a factor having direct and indirect influences on a field issue in evaluating performance of communication with a network.

Furthermore, the scored and quantitative results of evaluation can be obtained by applying root cause analysis (RCA).

Furthermore, the reliability of the evaluation of performance of communication with a network is secured by selecting a determination criterion according to a performance index and introducing a score subtraction method in a shadow area.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

The invention claimed is:

1. A method of evaluating performance of a communication apparatus for a vehicle, the method being performed by the communication apparatus and comprising:

performing communication with a base station;

monitoring a fail event and determining a fail event score based on results of the monitoring;

monitoring an attempt of a handover and determining a pingpong handover (PPHO) score based on the results of the monitoring;

monitoring a retention time within a shadow area and determining a service score based on the results of the monitoring; and determining a final score based on the fail event score, the PPHO score, and the service score, wherein the PPHO score is determined by subtracting a value that has been preset in a PPHO or a pattern PPHO from an initial value that has been arbitrarily set when the PPHO or the pattern PPHO occurs.

2. The method of claim 1, wherein determining the fail event score comprises:

generating a communication measurement log based on the results of the monitoring of the fail event; and determining the fail event score based on the communication measurement log.

3. The method of claim 2, wherein determining the fail event score comprises:

dividing a driving route of a vehicle generated based on the communication measurement log into a plurality of binning distances having preset arbitrary intervals; and determining the fail event score by considering, as one fail event, a plurality of same fail events that overlap and occur within one divided binning distance.

4. The method of claim 2, wherein the fail event score is determined by subtracting a preset value from an initial value that has been arbitrarily set based on a fail event parameter included in the communication measurement log.

5. The method of claim 4, wherein the fail event parameter comprises at least one of "RLF", "Continuous Weak SINR", "310_Expiry", "RRE Reject", "RACH_PROBLEM", "MAX_RETRX", "rlc_MaxNumRetx", "randomAccessProblem", and "SIB_READ_FAILURE".

6. The method of claim 1, wherein the PPHO is determined to have occurred when a source physical cell identifier (PCI), that is, a PCI of a source cell, before at least one handover is performed and a target PCI, that is, a PCI of a target cell, after the handover is finally performed are identical with each other and an interval between attempts of the handover is less than a first threshold time, when the handover is performed.

7. The method of claim 6, wherein the pattern PPHO is determined to have occurred when the source PCI and the target PCI are identical with each other and an interval between attempts of the handover is equal to or greater than the first threshold time and is less than a second threshold time, when the handover is performed.

8. The method of claim 1, wherein the service score is determined based on a ratio of the retention time within the shadow area, in which the communication apparatus for a vehicle enters the shadow area in which communication with the base station is impossible and maintains the state in which the communication is impossible, compared to an entire call measurement time of the communication apparatus for a vehicle.

9. The method of claim 1, wherein the final score is obtained by incorporating each of the fail event score, the PPHO score, and the service score at an arbitrary ratio and summing the fail event score, the PPHO score, and the service score.

10. A communication apparatus for a vehicle, comprising:

a communication unit configured to communicate with a base station; and a processor configured to monitor a fail event, determine a fail event score based on results of the monitoring of the fail event, monitor an attempt of a handover, determine a pingpong handover (PPHO) score based on results of the monitoring of the attempt of the handover, monitor a retention time within a shadow area, determine a service score based on results of the monitoring of the retention time, and determine a final score based on the fail event score, the PPHO score, and the service score, wherein the processor determines the PPHO score by subtracting a value that has been preset in a PPHO or a pattern PPHO from an initial value that has been arbitrarily set when the PPHO or the pattern PPHO occurs.

11. The communication apparatus of claim 10, wherein the processor generates a communication measurement log based on the results of the monitoring of the fail event and determines the fail event score based on the communication measurement log.

12. The communication apparatus of claim 11, wherein the processor divides a driving route of a vehicle generated based on the communication measurement log into a plurality of binning distances having preset arbitrary intervals, and determines the fail event score by considering, as one fail event, a plurality of same fail events that overlap and occur within one divided binning distance.

13. The communication apparatus of claim 11, wherein the fail event score is determined by subtracting a preset value from an initial value that has been arbitrarily set based on a fail event parameter included in the communication measurement log.

14. The communication apparatus of claim 13, wherein the fail event parameter comprises at least one of "RLF", "Continuous Weak SINR", "310_Expiry", "RRE Reject", "RACH_PROBLEM", "MAX_RETRX", "rlc_MaxNumRetx", "randomAccessProblem", and "SIB_READ_FAILURE".

15. The communication apparatus of claim 10, wherein the PPHO is determined to have occurred when a source physical cell identifier (PCI), that is, a PCI of a source cell, before at least one handover is performed and a target PCI, that is, a PCI of a target cell, after the handover is finally performed are identical with each other and an interval between attempts of the handover is less than a first threshold time, when the handover is performed.

16. The communication apparatus of claim 15, wherein the pattern PPHO is determined to have occurred when the source PCI and the target PCI are identical with each other and an interval between attempts of the handover is equal to or greater than the first threshold time and is less than a second threshold time, when the handover is performed.

17. The communication apparatus of claim 10, wherein the service score is determined based on a ratio of the retention time within the shadow area, in which the communication apparatus for a vehicle enters the shadow area in which communication with the base station is impossible and maintains the state in which the communication is impossible, compared to an entire call measurement time of the communication apparatus for a vehicle.

18. The communication apparatus of claim 10, wherein the final score is obtained by incorporating each of the fail event score, the PPHO score, and the service score at an arbitrary ratio and summing the fail event score, the PPHO score, and the service score.

* * * * *